Figure 2:
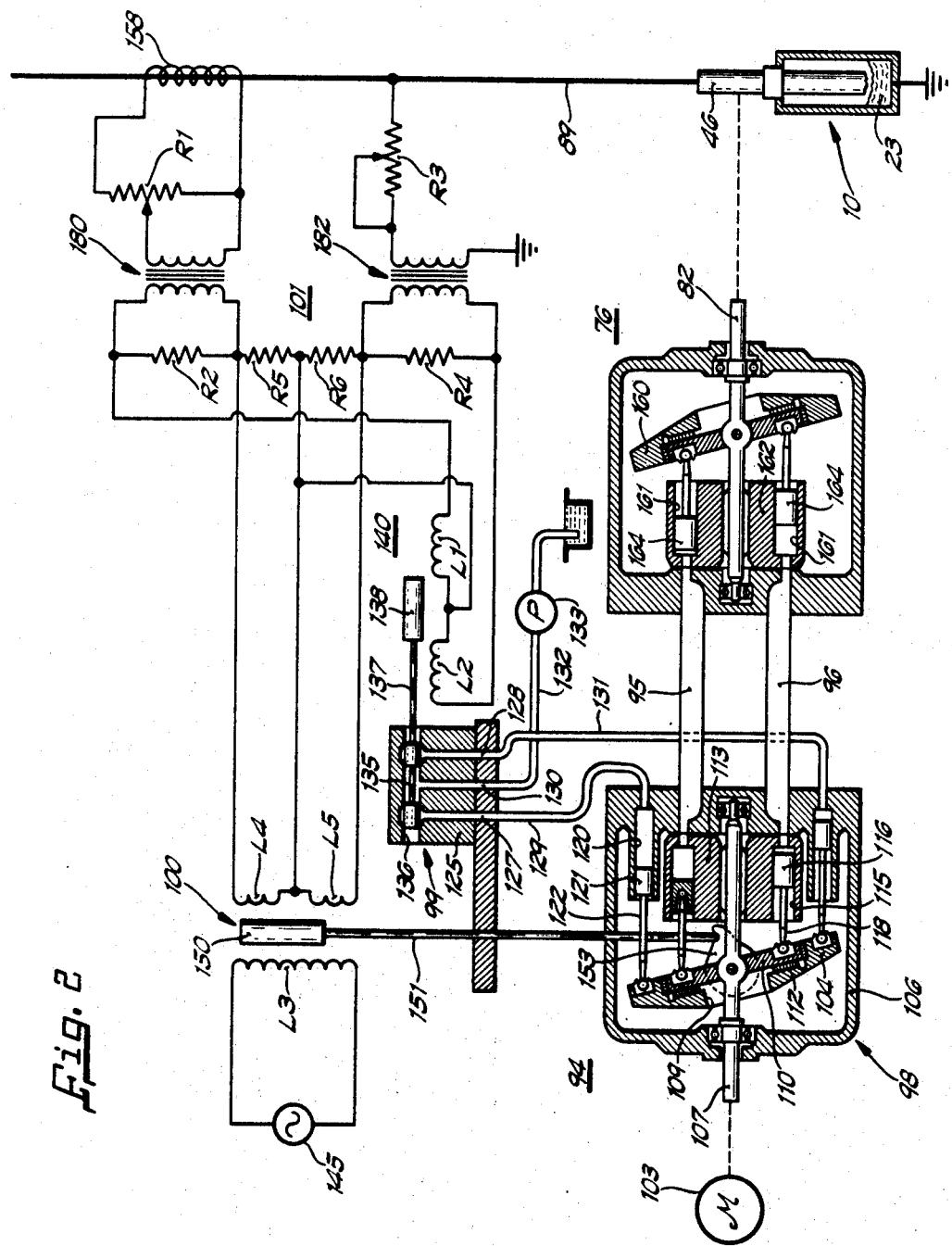

April 23, 1968 P. J. WYNNE 3,379,919
HYDRAULIC ELECTRODE POSITIONING MEANS FOR
AN ELECTRIC ARC FURNACE
Filed May 17, 1965 3 Sheets-Sheet 1
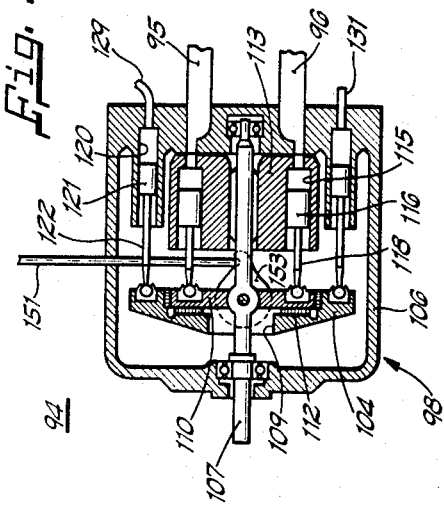
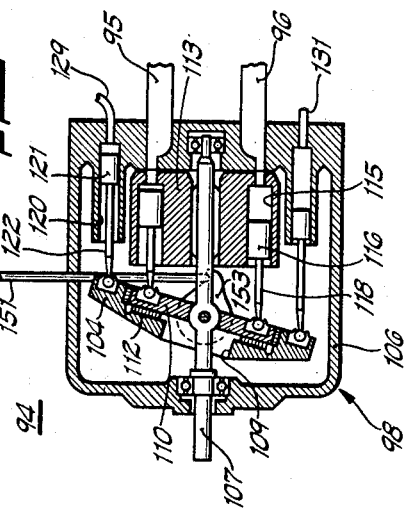
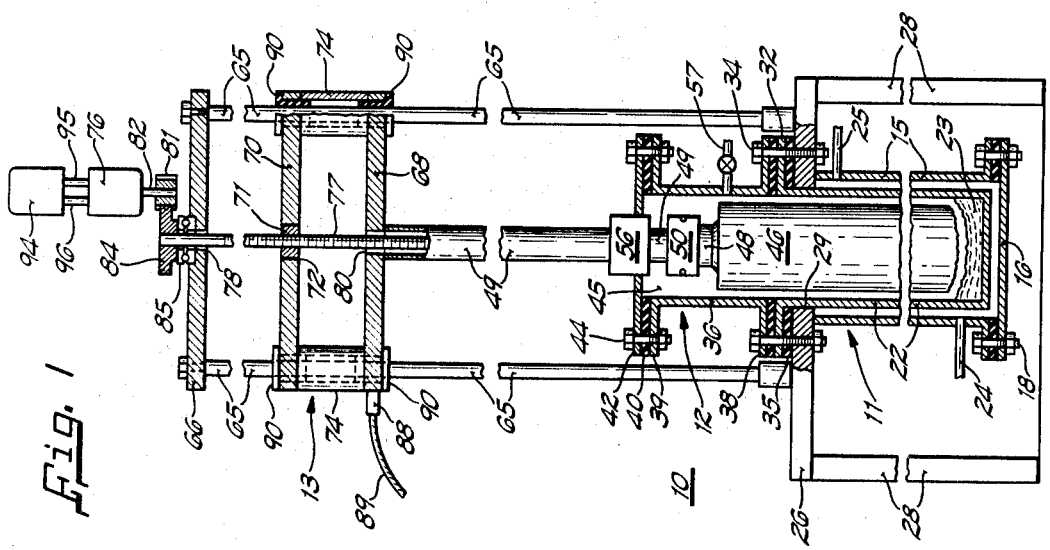
INVENTOR.
Peter J. Wynne
BY Fred Wirrott
Attorney INVENTOR.
Peter J. Wynne
BY Fred Wirutt
Attorney April 23, 1968 P. J. WYNNE 3,379,919
HYDRAULIC ELECTRODE POSITIONING MEANS FOR
AN ELECTRIC ARC FURNACE
Filed May 17, 1965 3 Sheets-Sheet 3

INVENTOR.
Peter J. Wynne
BY
Fred Wivitt
Attorney

United States Patent Office 3,379,919
Patented Apr. 23, 1968

3,379,919
HYDRAULIC ELECTRODE POSITIONING MEANS FOR AN ELECTRIC ARC FURNACE
Peter J. Wynne, Pittsburgh, Pa., assignor, by mesne assignments, to Lectromelt Corporation, Pittsburgh, Pa., a corporation of Delaware
Filed May 17, 1965, Ser. No. 456,157
10 Claims. (Cl. 314—61)

This invention relates to electric arc furnaces and, more particularly, to apparatus for controlling the positioning of the electrodes in a controlled atmosphere consumable electrode type electric arc furnace.

Consumable electrode electric arc furnaces have been widely used for such applications as the melting of the refractory metals, of which titanium is an example. Such furnaces, in general, include a sealed chamber wherein a consumable electrode is progressively melted under a controlled atmosphere and the resulting molten metal collected in a mold or crucible to form an ingot. Melting is accomplished by means of an arc which is drawn between the consumable electrode and the ingot, and which is sustained by a relatively large direct current. As the ingot forms, the electrode length gradually decreases so that it must be lowered in order to maintain the proper arc length for the desired melting conditions. For this purpose, prior art furnaces provided an electric motor driven electrode ram for feeding the electrode toward the ingot in accordance with the electrical conditions in the arc.

In addition to this general downward movement of the electrode as the ingot forms, the electrode must also be positioned relative to the ingot as the arc current and voltage fluctuates. Thus, the electrode must be raised when the arc current increases indicating that the arc is too short and the electrode must be lowered when the arc voltage increases indicating that the arc is too long. These fluctuations in the arc current and voltage require continual reversal in the direction of rotation of the electric drive motor. Because of the inertia of electric motors, the speed of response and sensitivity of prior art electrode controls were relatively limited.

It is an object of the invention to provide a new and improved electrode positioning assembly having a rapid speed of response and a high degree of sensitivity.

A further object of the invention is to provide a drive assembly for positioning the electrode of an electric arc furnace and which has a wide speed range and a high resolution.

A more specific object of the invention is to provide an electric arc furnace electrode positioning assembly employing a rotary hydraulic motor drive by a rotary hydraulic pump whose output is controlled by the electrode arc current and voltage conditions.

Figure 5:
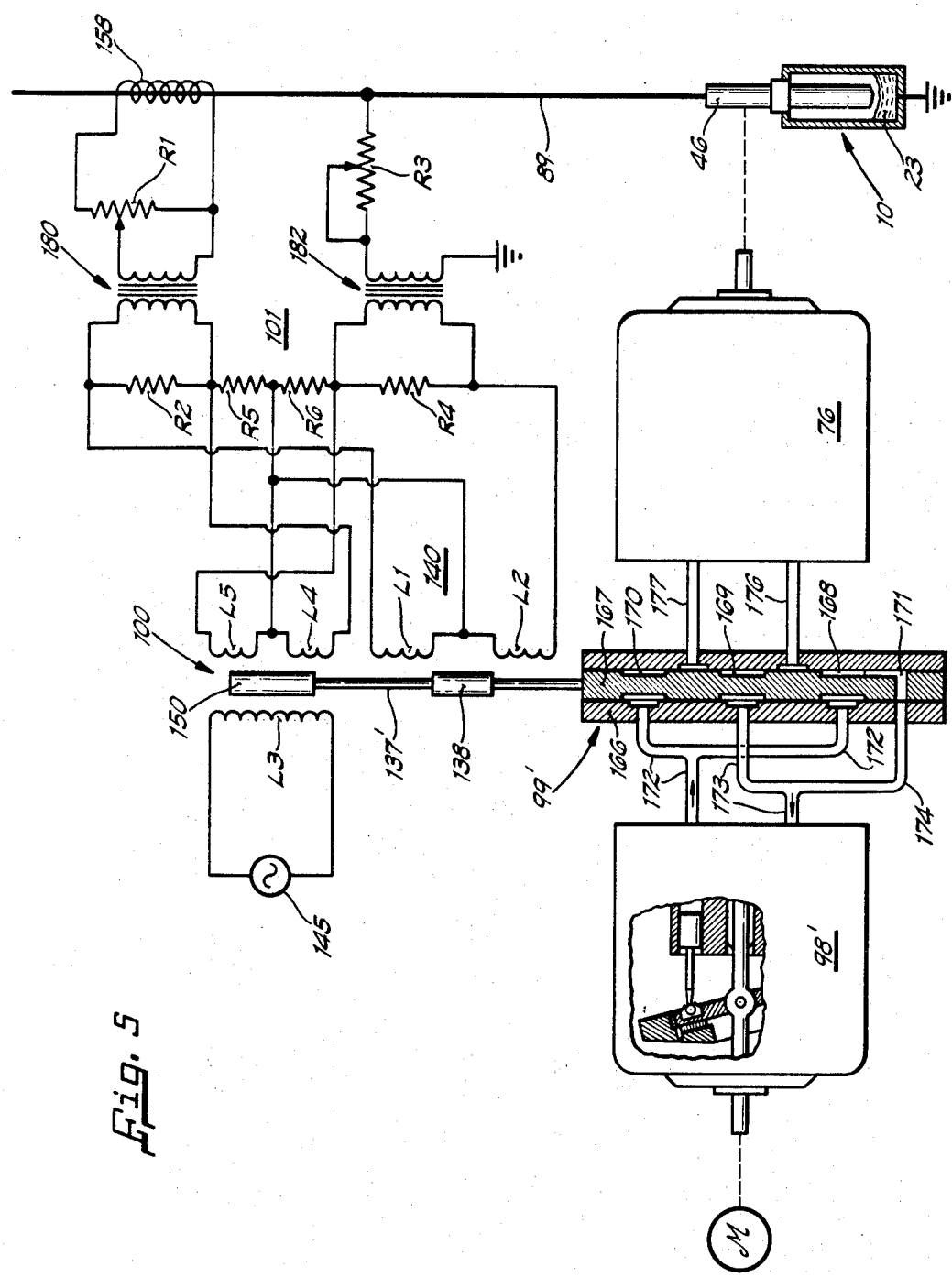

These and other objects and advantages of the incident mentioned will become more apparent from the detailed description thereof taken with the accompanying drawings in which:

FIG. 1 is a side elevational view, partly in section, of a consumable electrode electric arc furnace incorporating the instant invention;

FIG. 2 schematically illustrates the electrode control and drive assembly for the furnace illustrated in FIG. 1;

FIGS. 3 and 4 show a portion of the control illustrated in FIG. 2 in its alternate positions; and FIG. 5 schematically illustrates an alternate embodiment of the instant invention.

In general terms the invention comprises an electric arc furnace having an electrode and a container for receiving molten metal and including circuit means for deriving an electric signal representative of the electric conditions in the electrode, reversible hydraulic motor means for positioning the electrode and hydraulic pump means having output means variable in direction and degree. The pump means is coupled to the motor for providing hydraulic fluid thereto at a rate determined by the degree and in a direction governed by the direction of the variation of the pump output means. In addition, feedback means is coupled to the pump output means for providing an electrical feedback signal functionally related to the degree and direction of variation of the pump output means and servo means is coupled to receive the electrode condition signal and the feedback signal and is operative to vary the degree and direction of the pump output means in a manner to cause the electrode to be moved relative to the work material in a direction and at a speed functionally related to the relative magnitude of the signals.

Referring now to the drawings in greater detail FIG. 1 shows a consumable electrode, controlled atmosphere, electric arc furnace designated by the reference numeral 10 and having a crucible section 11, a throat section 12 and an electrode drive assembly 13.

The crucible section 11 includes an outer, substantially cylindrical shell 15 having a bottom closure member 16 which is affixed thereto in a hermetically sealed relation by means of bolts 18 to provide a cooling jacket for a crucible 22 disposed therein and which receives an ingot 23 formed from the metal being melted. The shell 15 is provided with a cooling fluid inlet pipe 24 and an outlet pipe 25. A horizontal mounting plate 26 is supported adjacent the upper end of the shell 15 by vertical columns 28 and has a central aperture 29 for receiving the upper end of the crucible 22. A flange 32 extends outwardly from the upper end of crucible 22 and is affixed to the upper surface of the mounting plate 26 by bolts 34. A gasket 35 is provided around the periphery of the aperture 29 and below the flange 32.

The throat section 12 of the furnace 10 includes an outer cylindrical housing 36 which is substantially coradial with the crucible 22 and which is affixed to the upper end thereof by the bolts 34 which engage an outwardly extending flange 38 at its lower end. A second flange 38 extends outwardly from the upper end of the throat housing 36 for receiving an annular gasket 40 and a cover plate 42, which are attached to the flange 39 by bolts 44. The cover plate 42 forms a closure for the hollow assembly 45 comprising a crucible 22 and the throat housing 36.

An electrode 46 is disposed within the hollow assembly 45 and has a stub 48 integrally formed at its upper end for releasable attachment to a hollow electrode ram 49 by a clamp 50. Electrode ram 49 slidably passes through a sealing bushing 56 in the cover plate 42, which provides a fluid tight seal for the enclosure 45 and, in addition, electrically insulates electrode 49 from the cover plate 42.

A pipe 57 is connected to the throat section 36 and communicates with the interior of the enclosure 45 for placing the latter in communication with an evacuator or source of inert gas if a partial vacuum or inert gas atmosphere is required during the melting operation.

The electrode drive assembly 13 is supported above the cover plate 42 by vertically extending rods 65 whose lower ends are affixed to the plate 42 and whose upper ends support a top plate 66. The drive assembly includes a first generally triangular plate 68 which is affixed to the upper end of the electrode ram 49 and a second generally triangular plate 70 disposed vertically above the plate 68 and having a nut 71 affixed in an aperture 72 provided therein and concentric with the ram 49. A tubular member 74 is slidably disposed on each of the support rods 65 and each is affixed at its lower end to the first triangular plate 68 and at its upper end to the second triangular plate 70 so that the plates 68 and 70 are coupled for sliding vertical movement on the support rods 65.

The electrode drive assembly 13 also includes a hydraulic drive motor 76 suitably mounted above the top plate 66 and a drive screw 77 which threadably engages the fixed nut 71 in the second triangular plate 70 and extends vertically downward through apertures 78 and 80 in the plates 66 and 68, respectively, and into the hollow interior of the electrode ram 49. A pinion 81 is carried on the output shaft 82 of the motor 76 and engages a gear 84 affixed to the upper end of the screw shaft 77 and rotatably mounted about the aperture 78 in plate 66 by a suitable bearing assembly 85.

Electrical energy is supplied to the electrode 46 through a terminal 88 mounted on plate 68 and which is constructed and arranged to receive a flexible conductor 89. Current flows from the plate 68 through the electrode ram 49, the clamp 50, the stub 48 and to the electrode 46. Insulating bushings 90, of any suitable material, insulate the guide rods 65 from the plates 68 and 70 and the tubes 74.

As will be discussed in greater detail hereinbelow, the motor 76 is controlled in accordance with electrode voltage and current conditions by a hydraulic control 94, which is connected to the motor 76 by conduits 95 and 96. The hydraulic control 94 causes the motor 76 to rotate in a direction which maintains the arc between the electrode 46 and the ingot 23 at a relatively uniform length. Thus, it can be seen from FIG. 1 that rotation of the motor 76 will rotate the screw shaft 77 through the agency of the pinion 81 and the gear 84. As the screw shaft 77 rotates, relative movement will be produced between it and the nut 71 affixed to the plate 70. This will cause the plate 70 to move in the direction governed by the rotational direction of the screw shaft 77 and this, in turn, will be transmitted to the electrode 46 through the agency of the tubular members 74, the plate 68 and the electrode ram 49.

Referring now to FIG. 2, the hydraulic control 94 for the motor 76 is shown in greater detail to include a pump 98, a servo valve 99, a feedback transducer 100, and a control circuit 101. The pump 98 is driven continuously by a motor 103 and the direction and magnitude of its output to the hydraulic motor 76 depends upon the position of the pump tilt plate 104. The control circuit 101 is coupled to the electrode energizing conductor 89 for sensing the magnitude of the electrode current and voltage and, in addition, is connected to the feedback transducer 100, which senses the position of the pump tilt plate 104.

The servo valve 99 is connected to the control circuit 101 for sensing an error signal produced by a change in electrode voltage and current conditions which indicates that the electrode arc length must be corrected and for repositioning the hydraulic motor tilt plate 104 in accordance with this error signal. The feedback transducer 100 in turn is repositioned according to the position of the tilt plate 104.

Those skilled in the art will appreicate that as the electrode 46 moves closer to the ingot 23, the arc resistance will decrease, increasing arc current and decreasing arc voltage. Conversely, as the distance between the electrode 46 and the ingot 23 increases, the arc resistance will increase to decrease arc current and increase arc voltage. When the distance between the electrode 46 and the ingot 23 is the predetermined desired value, the voltage and current signals and the signals from the feedback transducer 100 will produce a zero error signal, so that the servo valve 99 will hold the tilt plate 104 in such a position as to maintain this electrode spacing.

Turning now more specifically to the hydraulic pump 98, it is shown to include an outer housing 106 which rotatably supports the opposite ends of an input shaft 107 coupled for unidirectional constant speed rotation to the motor 103. The shaft 107 passes through an opening 109 in the tilt plate 104 and is pivotally connected to a socket ring 110 which is disposed in sliding engagement within a circular recess 112 formed in the tilt plate 104. Coupled to the opposite end of the shaft 107 and rotatable therewith is a cylinder barrel 113 which has a plurality of pump cylinders 115 formed therein and each of which is provided with a pump piston 116. Each of the pump pistons 116 is suitably coupled by a rod 118 to the socket ring 110.

In addition, a pair of positioning cylinders 120 are formed in the housing 106 and each is provided with a positioning piston 121 which is coupled to the opposite side of the tilt plate 104 by rods 122. It will be appreciated that the angle of the tilt plate 104 will be determined by the positions of the pistons 121 and this will also determine the angle of the socket ring 110.

As the shaft 107 is rotated to rotate the sprocket ring 110 and the barrel cylinder 113, the tilt plate 104 will remain stationary so that the socket ring 110 will oscillate to move the pistons 116 inwardly and outwardly of their respective cylinders 115. Thus, when the tilt plate 104 is in the position shown in FIG. 2, the lowermost of the cylinders 116 is finishing its pump stroke, while the upper cylinder 116 is finishing its intake stroke.

It will be appreciated that the stroke length of the pistons 116 and, accordingly, the quantity of fluid pumped, will be determined by the angle of the tilt plate 104. Thus, while fluid will flow when the plate 104 is tilted as shown in FIGS. 2 and 4, no fluid will be pumped when the tilt plate 104 is in a neutral position shown in FIG. 3. In addition, the direction that plate 104 is tilted will determine the direction of fluid flow so that when the plate 104 is in its position shown in FIG. 2 fluid will be pumped in one direction and when the plate 104 is in its reversed position shown in FIG. 4, fluid flow will be in the reverse direction.

The servo valve 99 includes a slide valve housing 125 having a first output 127 and a second output 128 which are respectively connected by conduits 129 and 131 to one of the positioning cylinders 120. In addition, the housing 125 has an input 130 connected by a conduit 132 to a small pilot pump 133. The servo 99 also includes a slide valve member 135 disposed in a slide valve cylinder 136 formed in housing 125 and which is coupled to each of the outputs 127 and 128 and the input 130. In addition, the slide valve member 135 is coupled by a stem 137 to the armature 138 of a torque motor 140. The torque motor 140 also includes a pair of windings L1 and L2 which are coupled to the control circuit 101 in a manner which will be described more fully hereinbelow.

The feedback transducer 100 consists of a linear variable differential transformer having a primary winding L3 which is connected to an alternating current source 145 and a pair of secondary windings L4 and L5 which are also connected to the control circuit 101 in a manner to be described. In addition, the feedback transducer includes an armature 150 which is coupled by a rod 151 to a positioning arm 153 affixed to the tilt plate 104. As those skilled in the art will appreciate, the output voltage at each of the secondary windings L4 and L5 will be determined by the position of the armature 150 and this, in turn, will be determined by the degree of tilt of the plate 104.

The control circuit 101 senses electrode current by means of a current transformer 158 whose secondary winding is coupled to the electrode supply conductor 89 and which is connected across a potentiometer R1 to provide a voltage signal proportional to electrode current. This voltage signal is applied to a first resistor R2 through a potential transformer 180. Thus, a voltage is produced across resistor R2 which is proportional to electrode current.

Electrode voltage is sensed by means of a potentiometer

R3 which is connected to conductor 89 and whose wiper is connected to the primary winding of a potential transformer 182. The secondary winding of transformer 182 is connected across a second resistor R4 so that a voltage signal will appear across R4 which is proportional to the voltage across the electrode 46.

The control circuit 101 also includes a second pair of resistors R5 and R6 which are connected in series between the resistors R2 and R4. One of the secondary windings L4 of the feedback transducer 100 is connected across resistor R5 and the other secondary winding L5 thereof is connected across resistor R6. In addition, one of the windings L1 of the torque motor 140 is connected across resistors R2 and R5, and the second winding L2 thereof is connected across resistors R4 and R6.

The motor 76 is identical to the pump 98, except that its tilt plate 160 is fixed to the output shaft 82. The speed of rotation of the motor 76 will be determined by the rate at which fluid is delivered to its cylinders 161 which are carried in a cylinder barrel 162 which is connected to the cylinder barrel 113 of the pump 98 by conduits 95 and 96. This fluid acting below the motor pistons 164 causes the shaft 82 to rotate through the agency of the plate 160 which is coupled to said shaft. In addition, the direction of rotation of the motor 76 will be determined by the direction in which the tilt plate 104 of the pump 98 is inclined.

Assume, for the sake of illustration, that electrode voltage and current are at the predetermined desired values, so that the electrode is to remain at rest. Under this condition of operation, the pump pivot plate 104 will be in its neutral position shown in FIG. 3, wherein there will be no output to the motor 76, which will then be at rest.

Should the distance between the electrode 46 and the ingot 23 become too long, so that there is an increase in arc voltage and a decrease in arc current, the voltage drop across resistor R4 will increase and that across resistor R2 will decrease. As a result, the voltage applied to winding L2 of the torque motor 140 will increase, while the voltage applied across the winding L1 thereof will decrease. This will cause the armature 138 to move to the left, as viewed in FIG. 2, thereby connecting output 127 of the servo valve 99 to the input 130, whereupon the uppermost positioning piston 121 will move toward the left to tilt the tilt plate 104 in the position shown in FIG. 2. Consequently, the pump 98 will begin fluid flow to the motor 76 in the forward direction. This, in turn, will cause the motor 76 to operate in a forward direction, which lowers the electrode 46.

In addition, as the tilt plate 104 pivots to the forward position shown in FIG. 2, the armature 150 will begin moving toward winding L4 and away from winding L5 to increase the voltage output of L4 and decrease the voltage output of L5. As a result, the voltage drop across resistor R5 will begin increasing and the voltage drop across resistor R6 will begin decreasing, so that the total voltage signal applied to winding L1 of torque motor 140 will begin to increase while the voltage applied to the winding L2 thereof will begin to decrease. When these voltages return to an equilibrium condition, the armature 138 of torque motor 140 will return to the neutral position to disconnect the output 127 of servo valve 99 from the input 130.

As the motor 76 rotates to move the electrode 46 closer to the ingot 23, the electrode current will begin increasing and the electrode voltage will begin decreasing. This, in turn, causes a proportional increase in the voltage drop across resistor R2 and a proportional decrease in the voltage across resistor R4 so that an error signal will again be detected by the servo valve 140. This will cause the armature 138 to begin moving toward the right, as viewed in FIG. 2, to connect the input 130 of servo valve 99 to the output 128. As a result, the tilt plate 104 will begin returning to its neutral position shown in FIG. 3, so that the output to the motor 76 will decrease and the motor will begin slowing down. When the electrode 46 arrives at the desired position relative to the ingot 23, the tilt plate 104 will have returned to its neutral position shown in FIG. 3 and the motor 76 stopped.

Should the distance between the electrode 46 and the ingot 23 become too short, so that an electrode raising operation is required, the electrode current will increase and electrode voltage will decrease, causing corresponding changes in the current proportional voltage across resistor R2 and the voltage proportional voltage across resistor R4. This, in turn, causes the armature 138 to move toward the right, as viewed in FIG. 2, to couple the output 128 of servo valve 99 to the input 130 so that the tilt plate 104 will tilt to the reverse position shown in FIG. 4, causing the motor to run in the reverse direction which begins raising the electrode 46. As the tilt plate 104 pivots, the armature 150 of the feedback transducer will begin moving toward the winding L5 and away from the winding L4 to increase the potential across resistor R6 and to decrease the potential across resistor R5. The potential across winding L2 of torque motor 140 will then begin increasing and the potential across winding L1 will begin decreasing, causing the armature 138 to begin moving toward its neutral position to disconnect output 128 from input 130.

As the electrode 46 moves away from the ingot 23, the voltage across resistor R4 will begin increasing and the voltage across R2 will begin decreasing so that the torque motor 138 will again be unbalanced, causing the slide valve 136 to begin moving toward the right. As a result, pressure will be applied to the uppermost of the positioning pistons 121, which will cause the tilt plate 104 to begin returning to its neutral position so that the motor 76 will begin operating at a slower rate of speed. When the electrode 46 reaches the desired position relative to the ingot 23, the system will again be in equilibrium, and the pump 98 will be in its neutral position shown in FIG. 3.

Those skilled in the art will appreciate that the control circuit 101 will also operate in a similar manner if either the current proportional voltage signal applied to resistor R2 or the voltage proportional voltage signal applied to resistor R4 were replaced by a reference voltage source.

From the foregoing, it will be appreciated that the electrode positioning assembly illustrated in FIG. 2 provides a differential electrode drive having a relatively rapid rate of response. In addition, because the inertia of the motor 76 is low, because only a small amount of oil is under pressure and because speed at which the motor 76 is rotated depends upon the distance that the electrode 46 deviates from the desired position relative to the ingot 23, the device has a relatively high resolution in that it will go closer to any given point than conventional electric or hydraulic systems. Further, because the speed of the motor 76 varies with the tilt of the plate 104, a much wider speed range is available than with electric or conventional hydraulic systems. Also, because of the relatively low inertia of the system, the drive assembly can be brought to a stop and reversed faster than conventional electrode drive systems.

Those skilled in the art will appreciate that in the case of a three-phase furnace having three electrodes 46 and three separate electrode energizing conductors 89 connected to a three-phase energizing system, an individual electrode motor 76 and hydraulic control 94 would be provided for each of said electrodes.

FIG. 5 schematically illustrates an alternate embodiment of the instant invention wherein the motor 76 and the pump 98' each have a fixed displacement. For this reason, direction and amplitude control of the fluid is provided by the servo valve 99'. Unless otherwise indicated each of the elements of the embodiment illustrated in FIG. 5 is identical to those of the embodiment illustrated in FIG. 2 and, accordingly, the same reference numeral is employed.

The servo valve 99' is schematically illustrated to include a cylinder 166 and a piston 167 slidably movable in the cylinder 166 and having axially spaced apart annular recesses 168, 169, and 170. In addition, the piston 167 is provided with an oblique passage 171 extending from the recess 168 so that when the piston 167 is in its neutral position shown in FIG. 5, the pump output conduit 172 is connected to the pump return conduit 173 by conduit 174. In addition, the motor 76 is connected to the cylinder 166 by first and second conduits 176 and 177. When the piston 167 is in its neutral position shown in FIG. 5, the conduit 176 is disposed between recesses 168 and 169 and conduit 177 is disposed between recesses 169 and 170 so that the motor 76 is disconnected from the pump 98' whereby the electrode 46 is at rest.

It will be recalled that when the distance between the electrode 46 and the ingot 23 becomes too long, the voltage applied to winding L2 of the torque motor 104 will increase while the voltage applied to winding L1 thereof will decrease. This will cause the armature 138 to move downwardly, as viewed in FIG. 2, thereby connecting the pump output conduit 174 to the motor conduit 177 through recess 170 in the piston 177. In addition, the pump return conduit 173 is connected to the motor conduit 176 through recess 169 while the bypass conduit 174 is disconnected from the passage 171. As a result, fluid will flow from the pump 98' to the motor 76 in a forward direction which, in turn, will cause the motor 76 to operate in a direction which lowers the electrode 46. It will be appreciated that the amount of fluid flowing to the motor 76 and which, in turn, controls the speed of motor rotation, will be governed by the degree of displacement of the position 167 from its neutral position.

It will also be appreciated that because the armature 138 is coupled to the armature 155 by stem 137', the armature 150 will also move downwardly and toward winding L4 and away from winding L5 to increase the voltage output of L4 and decrease the voltage output of L5. As a result, the total voltage signal applied to winding L1 of torque motor 140 will increase while the voltage applied to the winding L5 will decrease. The armature 138 of torque motor 140 will then begin returning to its neutral position thereby to disconnect the motor 76 from the pump 98' when equilibrium is again achieved.

If, on the other hand, the distance between the electrode 46 and the ingot 23 becomes too short so that an electrode raising operation is required, electrode current will increase and electrode voltage will decrease causing the armature 138 to move upwardly as viewed in FIG. 5. As a result, the motor conduit 176 is connected to the pump output conduit 172 through recess 176 while the conduit 177 is connected to the pump return conduit 173 through the recess 169. As a result the motor 176 runs in the reverse direction to raise the electrode 46 so that when the desired electrode gap is achieved the system is returned to equilibrium in the manner previously described.

While the invention has been illustrated and described with reference to a particular type of electric arc furnace, those skilled in the art will appreciate that it has application to other types of furnaces as well. In addition, while only a few embodiments of the invention have been illustrated, it is not intended to be limited thereby, but only by the scope of the appended claims.

I claim:

1. In an electric arc furnace having an electrode and a container for receiving work material heated as a result of an electric current flowing in said electrode, the combination of, circuit means for deriving an electric signal representative of the electric conditions in said electrode, reversible hydraulic motor means coupled to said electrode for positioning the same relative to said work material, variable output hydraulic pump means having output means variable in direction and degree and coupled to said motor for providing hydraulic fluid to said motor at a rate determined by the degree and in a direction governed by the direction of the variation of said output means, feedback means coupled to said pump output means for providing an electrical feedback signal functionally related to the degree and direction of the variation of said pump output means, and servo means coupled to receive said electrode condition representative signal and the feedback signal and operative to vary the degree and direction of said output means in a manner to cause said electrode to be moved relative to said work material in a direction and at a speed functionally related to the relative magnitudes of said signals.

2. In an electric arc furnace having an electrode and a container for receiving work material heated as a result of an electric current flowing in said electrode, the combination of, circuit means for deriving an electric signal representative of the electric conditions in said electrode, reversible hydraulic motor means having an output shaft coupled to said electrode for positioning the same relative to said work material, a rotary hydraulic pump coupled to said hydraulic motor and having an input shaft rotated at a substantially constant rate of speed, said pump having output means variable in direction and degree and coupled to said motor for providing hydraulic fluid to said motor at a rate determined by the degree and in a direction governed by the direction of the variation of said output means, said motor output shaft being rotated in direction and speed corresponding to the rate and direction of fluid supplied by said pump, feedback means coupled to said pump output means for providing an electrical feedback signal functionally related to the degree and direction of the variation of said pump output means, and servo means coupled to receive said electrode condition representative signal and the feedback signal and operative to vary the degree and direction of said output means in a manner to cause said electrode to be moved relative to said work material in a direction and at a speed functionally related to the relative magnitudes of said signals.

3. In an electric arc furnace having an electrode and a container for receiving work material heated as a result of an electric current flowing in said electrode, the combination of, first circuit means for deriving a first electric signal proportional to electrode voltage, second circuit means for deriving a second electrical signal proportional to electrode current, reversible hydraulic motor means coupled to said electrode for positioning the same relative to said work material, a rotary hydraulic pump coupled to said hydraulic motor and having an input shaft rotated at a substantially constant rate of speed, said pump having output means variable in direction and degree and coupled to said motor for providing hydraulic fluid to said motor at a rate determined by the degree and in a direction governed by the direction of the variation of said output means, feedback means coupled to said pump output means for providing an electrical feedback signal functionally related to the degree and direction of displacement of said pump output means, and servo means coupled to receive said electrode voltage and current representative signals and the electrical feedback signal and operative to vary the degree and direction of said output means in a manner to cause said motor to move said electrode in a direction and at a speed functionally related to the relative magnitudes of said signals.

4. In an electric arc furnace having an electrode and a container for receiving work material heated as a result of an electric current flowing in said electrode, the combination of, circuit means for deriving an electric signal representative of the electrical conditions in said electrode, a rotary hydraulic motor having piston and cylinder means and an output shaft coupled to said piston means and rotatable at a speed and in a direction governed by the rate and direction that fluid is supplied to said cylinder means, said motor output shaft being coupled to said electrode for positioning the same in accordance with the rotation thereof, a rotary hydraulic pump having an input shaft rotated at a substantially constant rate of speed and output means having a control part variable in degree and magnitude and piston and cylinder means coupled to said motor cylinder means for providing hydraulic fluid to said motor at a rate and in a direction governed by the degree and direction of the variation in said control part, feedback means coupled to said control part for providing an electrical signal functionally related to the magnitude and direction of variation of said control part, and servo means coupled to receive said electrode condition representative signal and the feedback signal and operative to vary the direction and magnitude of said control part so as to cause the movement of said electrode in a manner tending to decrease the deviation of said electrode condition representative signal from a predetermined valve.

5. In a controlled atmosphere consumable electrode arc furnace, the combination of, a sealed chamber, a consumable electrode extending into said chamber, circuit means for deriving an electric signal functionally related to the electric conditions in said electrode, a rotary hydraulic motor having piston and cylinder means and an output shaft coupled to said piston means and rotatable at a speed and in a direction governed by the rate and direction that fluid is supplied to said cylinder means, said motor output shaft being coupled to said electrode for positioning the same in accordance with the rotation thereof, a rotary hydraulic pump having an input shaft rotated at a substantially constant rate of speed and output means having a control part variable in direction and magnitude from a neutral position and piston and cylinder means coupled to said motor cylinder means for providing hydraulic fluid to said motor at a rate governed by the degree and in a direction governed by the direction that said control part varies from said neutral position, feedback means coupled to said control part for providing an electrical signal functionally related to the degree and direction of variation of said control part, and servo means coupled to receive said electrode condition representative signal and the feedback signal and operative to vary the degree and direction that said control part varies from its neutral position in accordance with the magnitude of said signals to cause said electrode to be moved relative to said chamber in a direction which tends to cause the return of said control part to its neutral position.

6. In a controlled atmosphere consumable electrode arc furnace, the combination of, a sealed chamber, a consumable electrode extending into said chamber, first circuit means for deriving a first electric signal proportional to electrode voltage, second circuit means for deriving a second electrical signal proportional to electrode current, reversible drive means coupled to said electrode for positioning the same and including a rotary hydraulic motor, said motor having piston and cylinder means and an output shaft coupled to said piston means and rotatable at a speed and in a direction governed by the rate and direction that fluid is supplied to said cylinder means, gear means coupled to said output shaft and said electrode for moving said electrode in accordance with the speed and direction of rotation of said output shaft, a rotary hydraulic pump having an input shaft rotated at a substantially constant rate of speed, and output means having a control part variable in direction and magnitude and piston and cylinder means coupled to said motor cylinder means for providing hydraulic fluid to said motor at a rate and in a direction governed by the direction and magnitude of variation in said control part, feedback means coupled to said control part for providing an electrical signal functionally related to the magnitude and direction of variation of said control part, and servo means coupled to receive said electrode voltage and current representative signals and the feedback signals representative of the degree and direction of displacement of said pump output means and operative to vary the direction and magnitude of said control part so as to cause the movement of said electrode in a manner tending to decrease the deviation of said voltage and current representative signals from a predetermined value.

7. In a consumable electrode arc furnace, the combination of, a furnace chamber, a consumable electrode extending into said chamber, circuit means for deriving an electric signal functionally related to the electric conditions in said electrode, a rotary hydraulic motor having piston and cylinder means and an output shaft coupled to said piston means and rotatable at a speed and in a direction governed by the rate and direction that fluid is supplied to said cylinder means, said motor output shaft being coupled to said electrode for positioning the same in accordance with the rotation thereof, a rotary hydraulic pump having an input shaft rotated at a substantially constant rate of speed and output means having a control part variable in direction and magnitude from a neutral position and piston and cylinder means coupled to said motor cylinder means for providing hydraulic fluid to said motor at a rate governed by the degree and in a direction governed by the direction that said control part varies from said neutral position, a linear variable differential transformer having a pair of secondary windings and an armature coupled to said control part for providing an electric feedback signal functionally related to the degree and direction of variation of said control part, and servo means including a torque motor coupled to receive said electrode condition representative signal and to said secondary windings to receive said feedback signal, said torque motor also being coupled to said control part for varying the degree and direction that said control part varies from its neutral position in accordance with the magnitude of said signals to cause said electrode to be moved relative to said chamber in a direction which tends to cause the return of said control part to its neutral position.

8. In an electric arc furnace having an electrode and a container for receiving work material heated as a result of a current flowing in said electrode, the combination of, circuit means for deriving an electric signal representative of the electrical conditions in said electrode, reversible hydraulic motor means coupled to said electrode for positioning the same relative to said work material, hydraulic means having output means variable in direction and degree coupled to said motor for providing hydraulic fluid to said motor at a rate determined by the degree and in a direction governed by the direction of the variation of said output means, feedback means coupled to said output means for providing an electrical feedback signal functionally related to the degree and direction of the variation of said output means, said hydraulic means including servo means coupled to receive said electrode condition representative signal and the feedback signal and operative to vary the degree and direction of said output means in a manner to cause said electrode to be moved relative to said work material in a direction and at a speed functionally related to the relative magnitude of said signals.

9. In an electric arc furnace having an electrode and a container for receiving work material heated as a result of an electric current flowing in said electrode, the combination of, circuit means for deriving an electric signal representative of the electrical conditions of said electrode, a rotary hydraulic motor having piston and cylinder means and an output shaft coupled to said piston means and rotatable at a speed and in a direction governed by the rate and direction that fluid is supplied to said cylinder means, said motor output shaft being coupled to said electrode for positioning the same in accordance with the rotation thereof, a rotary hydraulic pump having an input shaft rotated at a substantially constant rate of speed and output means including piston and cylinder means for providing hydraulic fluid fixed in magnitude and direction, servo means having a control part variable in direction and magnitude and coupled between said pump output means and said motor piston and cylinder means for controlling the direction and rate of fluid flow between said pump and said motor, feedback means coupled to said servo control part for providing an electrical signal functionally related to the magnitude and direction of the variation of said control part, said servo means being coupled to receive said electrode condition representative signal and the feedback signal and operative to vary the direction and the magnitude of the variation of said control part so as to cause the movement of said electrode in the manner tending to decrease the variation of said electrode condition representative signal from a predetermined value.

10. In a consumable electrode arc furnace, the combination of, a furnace chamber, a consumable electrode extending into said chamber, circuit means for deriving an electric signal functionally related to the electrical conditions in said electrode, a rotary hydraulic motor having piston and cylinder means and an output shaft coupled to said piston means and rotatable at a speed and in a direction governed by the rate and direction that fluid is supplied to said cylinder means, said motor output shaft being coupled to said electrode for positioning the same in accordance with the rotation thereof, a rotary hydraulic pump having an input shaft rotated at a substantially constant rate of speed for providing a unidirectional flow of hydraulic fluid at a substantially constant rate of speed, servo means for connecting said rotary hydraulic pump to the piston and cylinder means of said motor and having a control part variable in direction and magnitude from a neutral position for varying the rate and direction of fluid flow between said pump and said motor, a linear variable differential transformer having a pair of secondary windings and an armature coupled to said control part for providing an electric feedback signal functionally related to the degree and the direction of variation of said control part, said servo means also including a torque motor coupled to receive said electrode condition representative signal and to said secondary windings to receive said feedback signal, said torque motor also being coupled to said control part for varying the degree and direction that the control part varies from its neutral position in accordance with the magnitude of said signals to cause said electrode to be moved relative to said chamber in a direction which tends to cause the return of said control part to its neutral position.

References Cited
UNITED STATES PATENTS

| | | | |
|---|---|---|---|
| 1,953,454 | 4/1934 | Wollaeger | 13—13 |
| 2,921,107 | 1/1960 | Toothman et al. | 314—61 XR |
| 3,249,673 | 5/1966 | Moore | 314—61 XR |
| 3,300,562 | 1/1967 | Moore | 13—13 |

BERNARD A. GILHEANY, *Primary Examiner.*

R. N. ENVALL, JR., *Assistant Examiner.*